United States Patent
Banerjea et al.

(10) Patent No.: US 9,161,362 B1
(45) Date of Patent: Oct. 13, 2015

(54) GROUP MANAGEMENT IN MULTIUSER COMMUNICATIONS

(71) Applicant: MARVELL INTERNATIONAL LTD., Hamilton (BM)

(72) Inventors: Raja Banerjea, Sunnyvale, CA (US); Hongyuan Zhang, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 290 days.

(21) Appl. No.: 13/925,596

(22) Filed: Jun. 24, 2013

Related U.S. Application Data

(63) Continuation of application No. 12/952,059, filed on Nov. 22, 2010, now Pat. No. 8,472,383.

(60) Provisional application No. 61/264,192, filed on Nov. 24, 2009.

(51) Int. Cl.
| | |
|---|---|
| *H04W 52/02* | (2009.01) |
| *H04W 72/00* | (2009.01) |
| *H04W 80/04* | (2009.01) |
| *H04W 88/06* | (2009.01) |
| *H04W 28/04* | (2009.01) |
| *H04W 72/04* | (2009.01) |

(52) U.S. Cl.
CPC .................................. *H04W 72/0473* (2013.01)

(58) Field of Classification Search
CPC ............ H04W 52/02; H04W 52/0216; H04W 72/005; H04W 80/04; H04W 88/06; H04W 28/04; H04W 72/04
USPC .................................. 370/311, 312, 328, 329
See application file for complete search history.

(56) References Cited

U.S. PATENT DOCUMENTS

| | | | |
|---|---|---|---|
| 5,933,787 | A | 8/1999 | Gilhousen et al. |
| 6,175,743 | B1 | 1/2001 | Alperovich et al. |
| 6,377,813 | B1 * | 4/2002 | Kansakoski et al. .......... 455/522 |
| 7,599,332 | B2 | 10/2009 | Zelst et al. |
| 7,742,390 | B2 | 6/2010 | Mujtaba |
| 8,155,138 | B2 | 4/2012 | van Nee |
| 8,289,869 | B2 | 10/2012 | Sawai |

(Continued)

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).

(Continued)

*Primary Examiner* — Ronald B Abelson

(57) ABSTRACT

An access point device selects a group of two or more transceivers from a plurality of transceivers for simultaneous transmission of respective data to the access point device. The group of transceivers is selected so that respective power levels of signals received, at the access point device, from any two transceivers in the group of transceivers differ by no more than a predetermined amount. An indication of assignment to the group of transceivers is transmitted to each transceiver in the group of transceivers. The access point device receives the respective data from each transceiver in the group of transceivers simultaneously via a shared wireless communication channel.

18 Claims, 12 Drawing Sheets

(56) References Cited

U.S. PATENT DOCUMENTS

| | | | |
|---|---|---|---|
| 8,526,351 | B2 | 9/2013 | Fischer et al. |
| 8,619,907 | B2 | 12/2013 | Mujtaba et al. |
| 8,724,546 | B2 | 5/2014 | Zhang et al. |
| 8,724,720 | B2 | 5/2014 | Srinivasa et al. |
| 2002/0098860 | A1* | 7/2002 | Pecen et al. ............. 455/522 |
| 2002/0145985 | A1* | 10/2002 | Love et al. ............. 370/328 |
| 2004/0057530 | A1 | 3/2004 | Tarokh et al. |
| 2004/0066766 | A1* | 4/2004 | Shiu et al. ............. 370/335 |
| 2005/0044473 | A1 | 2/2005 | Huang et al. |
| 2006/0014554 | A1 | 1/2006 | Gerlach |
| 2007/0171808 | A1* | 7/2007 | Wu et al. ............. 370/208 |
| 2007/0223469 | A1* | 9/2007 | Chandra et al. ............. 370/389 |
| 2008/0084837 | A1 | 4/2008 | Watanabe et al. |
| 2008/0310363 | A1* | 12/2008 | McBeath et al. ............. 370/330 |
| 2009/0196163 | A1 | 8/2009 | Du |
| 2011/0002219 | A1 | 1/2011 | Kim et al. |
| 2011/0096796 | A1 | 4/2011 | Zhang et al. |

OTHER PUBLICATIONS

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, 23 pages, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE P802.11n™ /D3.00, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Chen, "Home Network Basis: Transmission Environments and Wired/Wireless Protocols," *Prentice Hall*, pp. 1-26 (Jul. 2003).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

van Nee, et al. "The 802.11n MIMO-OFDM Standard for Wireless LAN and Beyond," Wireless Personal Communications, vol. 37, pp. 445-453 (Jun. 2006).

* cited by examiner

GROUP MANAGEMENT IN MULTIUSER COMMUNICATIONS

CROSS-REFERENCE TO RELATED APPLICATION

This application is a continuation of U.S. application Ser. No. 12/952,059, entitled "Group Management in Multiuser Communications," filed on Nov. 22, 2010, which claims the benefit of U.S. Provisional Patent Application No. 61/264,192, entitled "VHT-SIG Procedure for UL-MU-MIMO," filed Nov. 24, 2009. The entire disclosures of both of the applications referenced above are hereby incorporated by reference herein.

FIELD OF THE DISCLOSURE

The present disclosure relates generally to communication systems and, more particularly, to controlling power at which signals are transmitted in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method includes selecting, at an access point device, a group of two or more transceivers from a plurality of transceivers for simultaneous transmission of respective data to the access point device, wherein the group of transceivers is selected so that respective power levels of signals received, at the access point device, from any two transceivers in the group of transceivers differ by no more than a predetermined amount. The method also includes transmitting to each transceiver in the group of transceivers an indication of assignment to the group of transceivers. The method further includes receiving, at the access point device, the respective data from each transceiver in the group of transceivers simultaneously via a shared wireless communication channel.

In another embodiment, an apparatus comprises an access point transceiver. The access point transceiver is configured to (i) select a group of two or more client transceivers from a plurality of client transceivers so that so that respective power levels of signals received, at the access point transceiver, from any two client transceivers in the selected group of client transceivers differ by no more than a predetermined amount, (ii) generate a communication frame to be transmitted to each client transceiver in the group of client transceivers, wherein the communication frame includes information indicative of which client transceivers in the plurality of client transceivers belong to the group, and (iii) process the respective data simultaneously received from each client transceiver in the group of client transceivers via a shared wireless communication channel.

DETAILED DESCRIPTION

Figure 1:
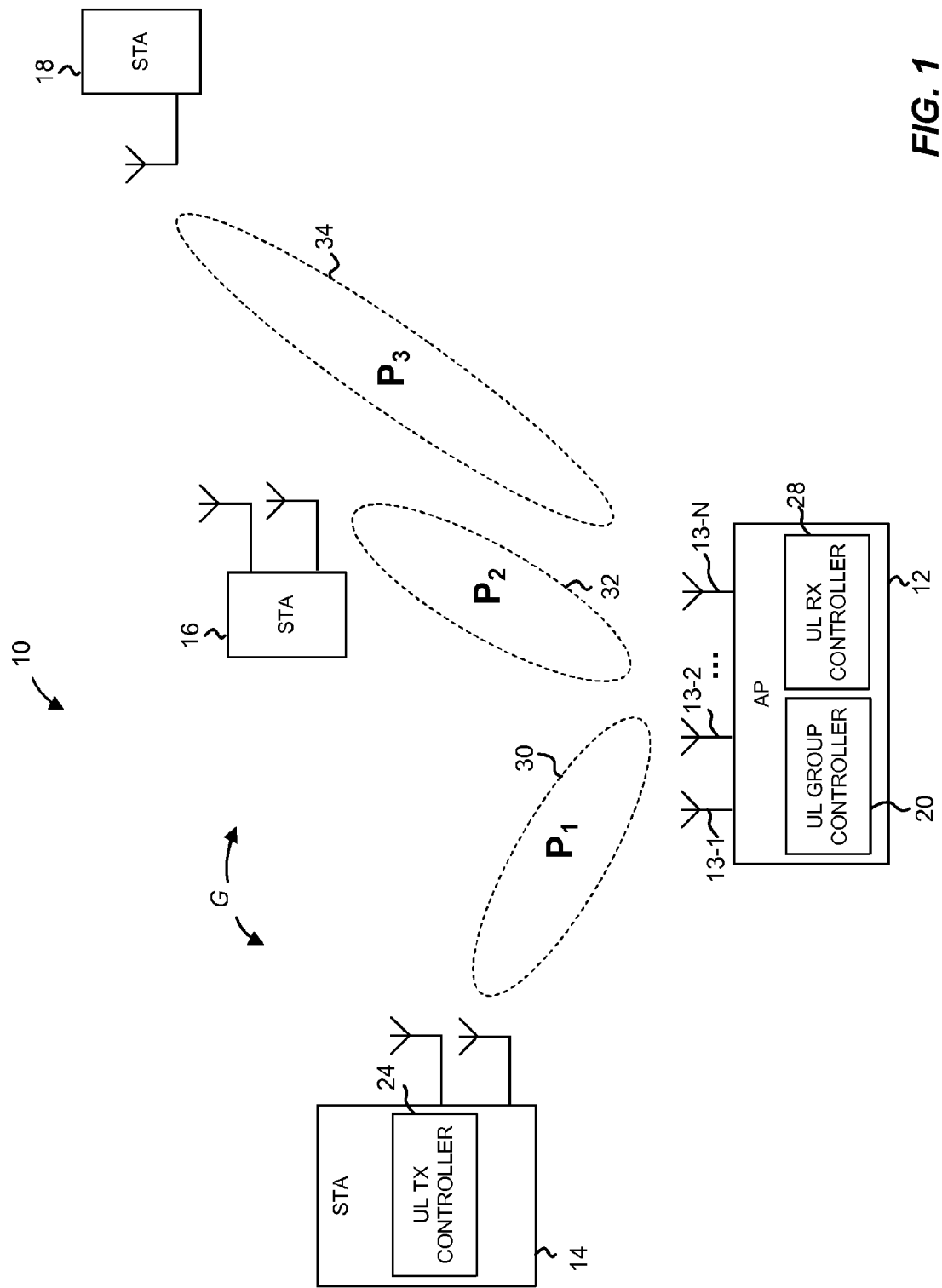
FIG. 1 is a block diagram of a communication system in which an access point (AP) selects a group of stations for simultaneous transmission of data to the AP, according to an embodiment of the present disclosure.

FIG. 1 is a block diagram of an example embodiment of a wireless local area network (WLAN) 10 in which a receiving device such as an access point (AP) 12 efficiently selects a group of transmitting devices from among stations (STAs) 14, 16, and 18, so that the stations in the selected group simultaneously transmit data to the AP 12 via a shared communication channel without having to adjust the respective transmit power levels. The AP 12 includes a set of N antennas 13-1, 13-2, . . . 13-N to provide multiple spatial streams via which the AP 12 receives data from multiple stations using spatial division multiple access (SDMA) or another suitable technique, in an embodiment. Depending on the scenario, each station in a certain group of selected transmitting devices utilizes one or more spatial streams to transmit data to the AP 12 at a time that coincides with simultaneous transmissions by other stations in the group.

In an embodiment, the AP 12 includes an uplink (UL) group controller 20 to select a group of stations from among multiple candidate stations (e.g., stations 14, 16, 18) for simultaneous uplink transmission (SUT), also referred to herein as uplink multiuser (UL MU) transmission, in view of such factors as the capability of the AP 12 to support various types of devices, modulation schemes, and messages, power level measurements of signals received from candidate stations, the quality of channels between the AP 12 and candidate stations, the amount of spatial co-channel interference between candidate stations or another indication of spatial diversity, the estimated distance between the AP 12 and one or more candidate stations 14-18, various multipath effects observed in communications with the candidate stations 14-18, etc. After a group of stations is selected, the AP 12 in some of the embodiments notifies each station selected for participation in the group that the station has been selected, and indicates an identity of the group using an assignment communication frame or another suitable communication frame or data unit. Further, in some embodiments, the UL controller 20 controls the timing of simultaneous UL transmissions from the stations in the selected group. For example, the UL controller 20 causes the AP 12 to transmit an uplink assignment indicator (USI) frame that identifies or otherwise indicates a certain group and, in response to receiving the USI frame, the stations associated with the group transmit the respective data upon expiration of a certain time interval such as a short interframe space (SIFS), according to an embodiment. It is noted that in some situations, simultaneous transmissions from several stations do not arrive at the AP 12 at exactly the same time due to multipath variation or other factors that affect propagation delays in the WLAN 10. Thus, as used herein, the term "simultaneous transmissions" refers to transmissions that substantially overlap in time and do not always completely coincide in transmission start time or transmission end time.

In some situations, the AP 12 selects the same set of stations for participation in simultaneous UL transmissions (hereinafter, a "UL group") and simultaneous downlink (DL) transmissions (hereinafter, a "DL group"). In some embodiments, the AP 12 uses the same mechanism (e.g., an assignment frame that conforms to a single format) to notify stations of assignment thereof to UL and DL groups. In one such embodiment, the AP 12 announces assignment of UL and DL groups to one or more stations at the same time. However, the AP 12 in other embodiments assigns a certain station to different groups for simultaneous UL and DL transmission.

In some cases, the UL group controller 20 selects and manages multiple UL groups, with some stations possibly being assigned to more than one UL group. Similarly, the AP 12 in at least some of the embodiments includes a DL group controller (not shown in FIG. 1) that also manages multiple DL groups. In some embodiments, the size of a group is limited to the number N of receive antennas at the AP 12. In an embodiment, the size of a group is further limited by a parameter of the protocol utilized by the AP 12 and the stations 14, 16, and 18.

In an example scenario, the AP 12 estimates that a power level $P_1$ associated with signals received from the station 14 and a power level $P_2$ associated with signals received from the station 16 differ by no more than a certain power level difference $D_P$, i.e., $|P_1-P_2| \le D_P$. On the other hand, the power level $P_2$ associated with signals received from the station 18 is significantly different from the power levels $P_1$ and $P_2$, i.e., $|P_3-P_1|>D_P$ and/or $|P_3-P_2|\le D_P$. Depending on the embodiment, the AP 12 uses channel sounding or another suitable technique to estimate a power level at which the station 14 communicates with the AP 12 via a channel 30. For example, in an embodiment, the AP 12 transmits a sounding packet to the station 14 at a certain power level, receives a feedback frame from the station 14 that indicates the strength of the signal associated with the sounding packet. In another embodiment, the AP 12 receives a sounding packet transmitted from the station 14 using a power level setting known to the AP 12 and measures the strength of the signal associated with the received sounding packet. Similarly, the AP 12 generates the corresponding metrics for the station 16 and/or a channel 32 between the station 16 and the AP 12, and the station 18 and/or a channel 34 between the station 18 and the AP 12, according to an embodiment. As used herein, the channels 30, 32, and 34 at least partially define a shared wireless communication channel associated with a particular frequency band.

To continue with the example scenario discussed above, the AP 12, in an embodiment, selects the stations 14 and 16 for participation in a certain group G in view of the estimated power levels $P_1$, $P_2$, and $P_3$. In some embodiments, the AP 12 additionally considers one or more other factors when forming the group G, such as the MCS(s) supported by each candidate station, spatial diversity among the candidate stations, the amount of data available at each candidate station (if known and available), multipath effects, etc. Depending on the embodiment, the AP 12 announces the formation of the group G using an assignment frame unicast to each of the stations 14 and 16, multicast to the stations 14 and 16, or broadcast through the WLAN 10. In an embodiment, the station 14 includes a UL transmit (Tx) controller 24 to process the assignment frame and control transmissions to the AP 12 that occur at the same time as transmissions from the station 16 to the AP 12. At least the station 16 includes a UL Tx controller (not shown) similar to the UL Tx controller 24, in an embodiment.

When transmitting data to the AP 12 in an UL MU mode as a participant in the group G, the station 14 does not to adjust its transmit power level relative to the nominal transmit power level of the station 14, nor does the station 16 need to adjust its transmit power level. Thus, in at least some of the scenarios, the AP 12 selects the group G so that each station participating in the group G transmits data to the AP 12 at its nominal transmit power level. By contrast, if the stations 14 and 18, or stations 16 and 18, use the same frequency to transmit data to the AP 12 at the same time, the AP 12 requests that one or both stations adjusts the corresponding transmit power levels so as to reduce interference between the signals transmitted from the stations. In general, when the AP 12 defines UL groups so as to obviate the need for transmit power level adjustment, expensive calibration of stations that operate in the WLAN 10 is not required.

Depending on the embodiment, the nominal transmit power level at a station is a factory setting, a value preprogrammed for the particular communication protocol utilized by the station, or another type of a default value. In at least some of the embodiments, stations use the nominal transmit power level when transmitting sounding packets. Further, in some embodiments, the AP 12 is capable of determining which of the candidate stations have the same (or sufficiently similar) nominal transmit power so as to determine which of the candidate stations can be efficiently grouped together for simultaneous uplink transmission when the AP 12, rather than the candidate station, transmits sounding packets.

With continued reference to FIG. 1, the AP 12 includes an UL receive (Rx) controller 28 configured to receive data simultaneously transmitted from the stations 14 and 16, separate the individual streams associated with the stations 14 and 16 respectively, perform other multiple-input, multiple-output (MIMO) processing functions, etc.

Figure 2:
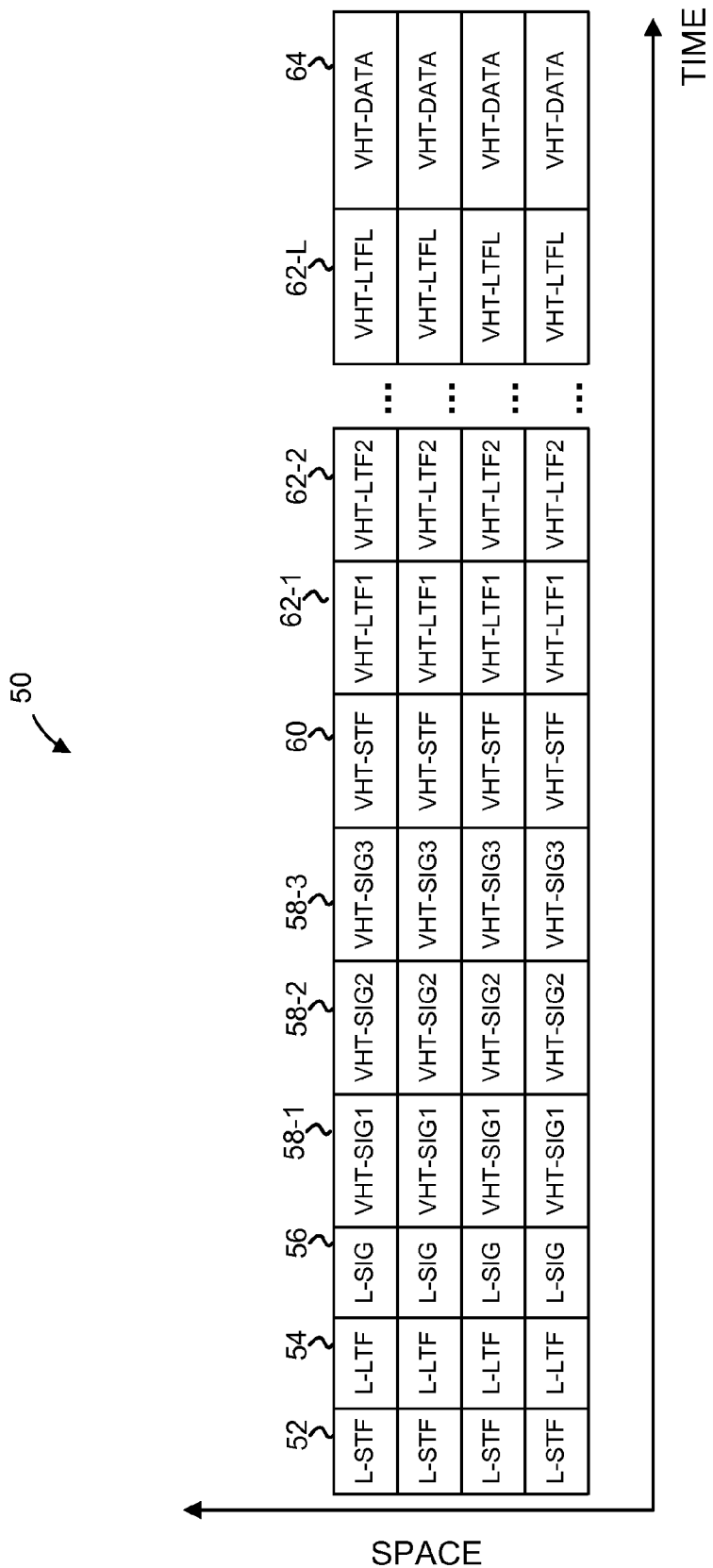
FIG. 2 is a block diagram of an example communication frame used in simultaneous uplink transmission of data from several stations to an AP, in an embodiment of the present disclosure.

FIG. 2 is a block diagram of an example communication frame 50 that stations 14 and 16 utilize to simultaneously transmit data to the AP 12, according to an embodiment. The communication frame 50 can be referred to as a UL MU data frame. Using SDMA, for example, a receiving device such as the AP 12 simultaneously receives several instances of the UL MU data frame 50 simultaneously transmitted from several transmitting devices such as the stations 12 and 14. In general, transmitting devices transmit identical information in certain portions of the UL MU data frame 50 and device-specific information in other portions of the UL MU data frame 50.

In an embodiment, the UL MU data frame 50 occupies a 80 MHz band and has a physical layer (PHY) preamble portion that includes a legacy short training field (L-STF field) 52, a legacy long training field (L-LTF) field 54, a legacy signaling field (L-SIG) 56, very high throughput signaling VHT-SIG fields 58-1, 58-2, and 58-3, a very high throughput short training field (VHT-STF) 60, and L very high throughput long training fields (VHT-LTFs) 62-1, 62-2 . . . 62-L. The L-STF 52 and VHT-STF 60 generally include information that is useful for packet detection and synchronization, whereas the L-LTF 54 and VHT-LTFs 62-1, 62-2 . . . 62-L generally include information that is useful for channel estimation and fine synchronization. More specifically, in at least some of the embodiments, the L VHT-LTFs 62-1, 62-2 . . . 62-L are used to train L streams via which the receiving device such as the AP 12 can receive data simultaneously transmitted from several stations participating in a UL group.

The fields 56 and 58-1, 58-2, and 58-3 generally signal PHY parameters to the receiving device. In an embodiment, the transmitting devices transmit identical information in the fields 56, 58-1, and 58-2, while the VHT-SIG3 field 58-3 indicates parameters specific to each transmitting device. In another embodiment, each of the fields 56 and 58-1, 58-2, and 58-3 includes identical information. Further, as discussed in more detail below, at least one of the fields 58-1, 58-2, and 58-3 is a copy of the VHT-SIG field transmitted in a preamble of an USI communication frame transmitted downlink from the receiving device to each of the transmitting devices prior to the UL MU data frames 50 being transmitted in the uplink direction.

A VHT data portion 64 includes information specific to each transmitting device. For example, the VHT data portion 64 in some cases includes PHY header data, MAC header data, and a data payload.

Figure 3A:
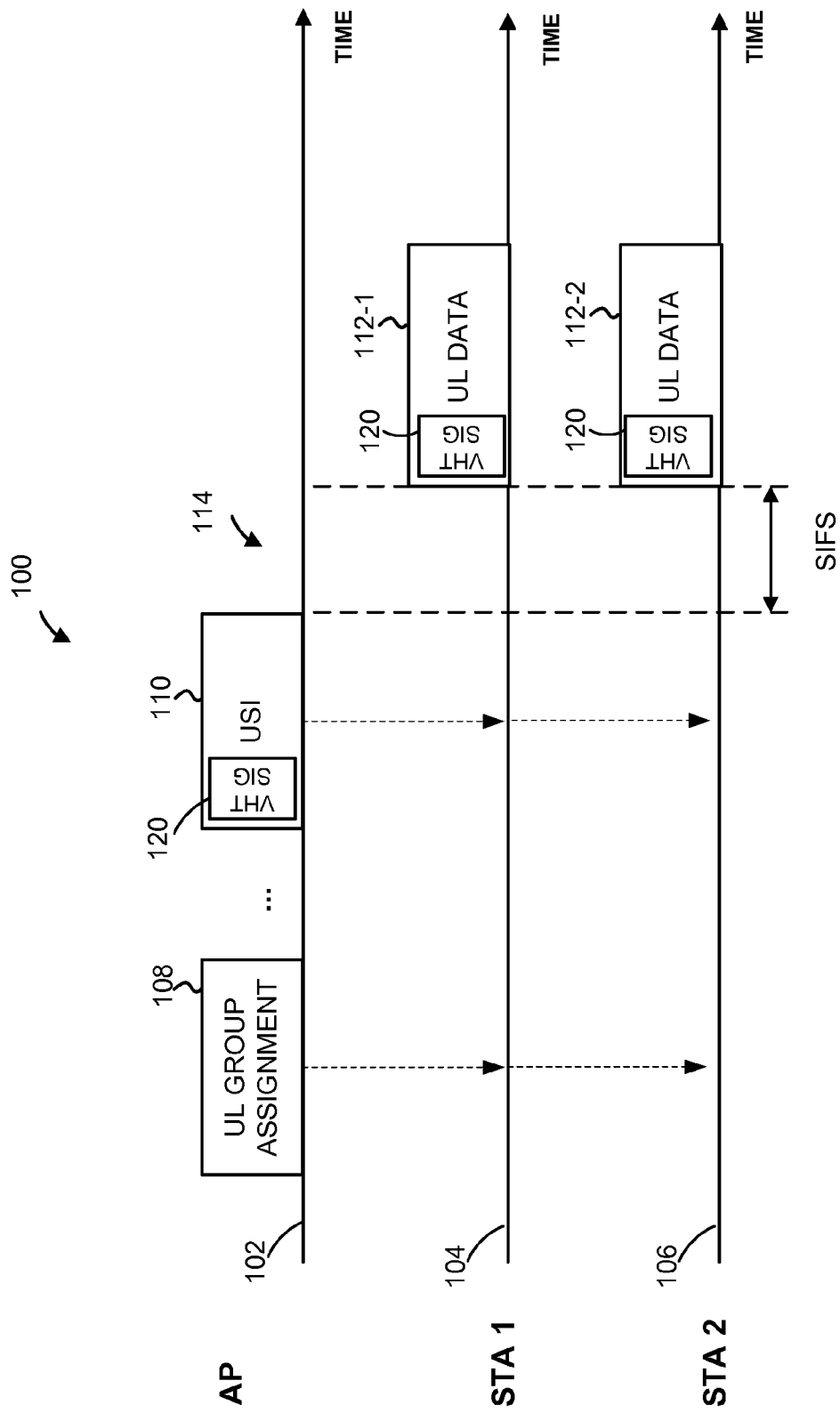
FIG. 3A is a timing diagram that illustrates a technique for controlling simultaneous uplink transmission from several stations to an AP, according to an embodiment of the present disclosure.
Figure 3B:
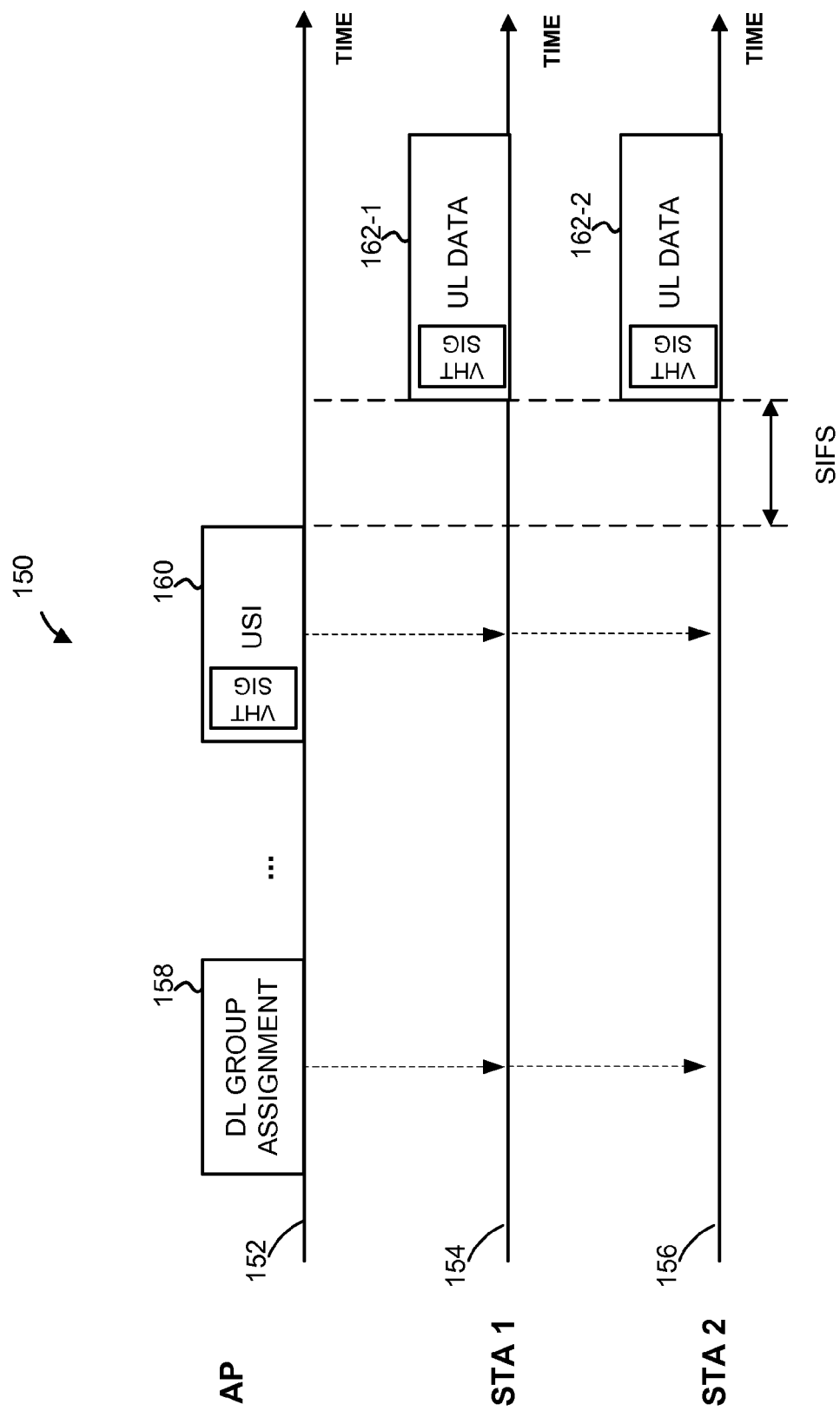
FIG. 3B is a timing diagram that illustrates another technique for controlling simultaneous uplink transmission from several stations to an AP, according to an embodiment of the present disclosure.

Next, FIGS. 3A and 3B illustrate example techniques for controlling simultaneous uplink transmission from several stations (or other types of transmitting devices) to an AP (or another type of a receiving device). Referring first to FIG. 3A, a period 100 is a transmission opportunity (TxOP), a portion of a service period (SP), or another suitable time period during which an AP 102 signals a selection of a UL group to stations 104 and 106, indicates a time at which the AP 102 is to receive data transmitted simultaneously from the stations 104 and 106, and receives data simultaneously transmitted from the stations in the UL group, according to an embodiment.

An assignment frame 108 in some embodiments indicates which of the candidate stations are assigned to a UL group. In an embodiment, the assignment frame 108 includes assignment information that pertains to several UL groups. The assignment information for each UL group indicates the identity of the UL group (e.g., a four-bit identifier) and the identity of each station included in the UL group (e.g., the association identity (AID)), according to an embodiment. Depending on the embodiment, the assignment frame 108 is broadcast to all candidate stations, multicast to the relevant stations, or transmitted separately to each station included in the UL group. In general, the AP 102 need not transmit the assignment frame 108 prior to each simultaneous transmission of data from the stations 104 and 106. For example, in a typical scenario consistent with one embodiment, the AP 102 selects several stations for participation in a UL group, transmits the assignment frame 108 to the selected stations, and receives simultaneously transmitted UL MU data frames several times without updating the membership of the UL group. Further, in some scenarios, other communications in an uplink and/or downlink direction occur between the transmission of the frames 108 and 110. Still further, in another embodiment, the assignment frame 108 is transmitted prior to the period 100, e.g., during a different timeslot, in a different superframe, etc.

The AP 102 generates and transmits to the stations 104 and 106 a USI frame 110 to indicate when the stations 104 and 106 can simultaneously transmit data to the AP 102 using communication frames 112-1 and 112-2, respectively, in accordance with at least some of the embodiments. In an embodiment, each of the communication frames 112-1 and 112-1 is formatted similar to the UL MU data frame 50 discussed above. As illustrated in FIG. 3A, the start of the communication frames 112-1 and 112-2 and the end of the USI frame 110 are separated by a gap 114 having a duration equal to a SIFS. In other embodiments, however, the gap 114 has a different duration such as, for example, a distributed control function (DFS) interframe space (DIFS). In either case, the gap 114 is predefined, preconfigured, or otherwise agreed upon by the transmitting devices and the receiving device, in an embodiment, so that the USI frame 110 implicitly indicates the timing of simultaneous transmissions from the stations 104 and 106. In another embodiment, however, the USI frame 110 explicitly indicates the timing of simultaneous transmissions from the stations 104 and 106 (e.g., using a field to specify the start time relative to the beginning of the service period, superframe, etc.).

An example format of the USI frame 110 is discussed with reference to FIG. 4. Briefly, the USI frame 110 identifies a UL group that is to transmit to the AP 102 following the gap 114 and, depending on the embodiment, also indicates one or more of stream allocation to the stations in the UL group, MCS selection, etc. Also, as illustrated in FIG. 3A, the USI frame 110 includes a VHT-SIG field 120 in the PHY preamble. In an embodiment, the stations 104 and 106 include a copy of the VHT-SIG field 120 in the communication frame 112-1 and the communication 112-2.

Now referring to FIG. 3B, a period 150 is generally similar to the period 100 discussed above, except that an AP 152 and stations 154, 156 use a DL group definition for simultaneous UL transmission, according to an embodiment. Further, an assignment frame 158 in some embodiments has a format generally similar to the assignment frame 108. In the example period 150 of FIG. 3B, the assignment frame 158 is a DL group assignment frame that indicates the make-up of one or several DL groups for simultaneous downlink transmission (i.e., from the AP 154 to the stations 154 and 156). At a later time, the AP 152 transmits a USI frame 160 that indicates a DL group to be used as an UL group for transmitting communication frames 162-1 and 162-2 from the stations 154 and 156, respectively, according to an embodiment.

Several example formats of communication frames used by the devices in simultaneous uplink transmission in various embodiments of the present disclosure, as well as formats of certain fields used in such communication frames, are discussed next with reference to FIGS. 4 and 5, and an example procedure for subspace index (SSI) allocation and MU sounding, along with an example format of a communication frame used in this procedure, are discussed with reference to FIGS. 6 and 7.

Figure 4:
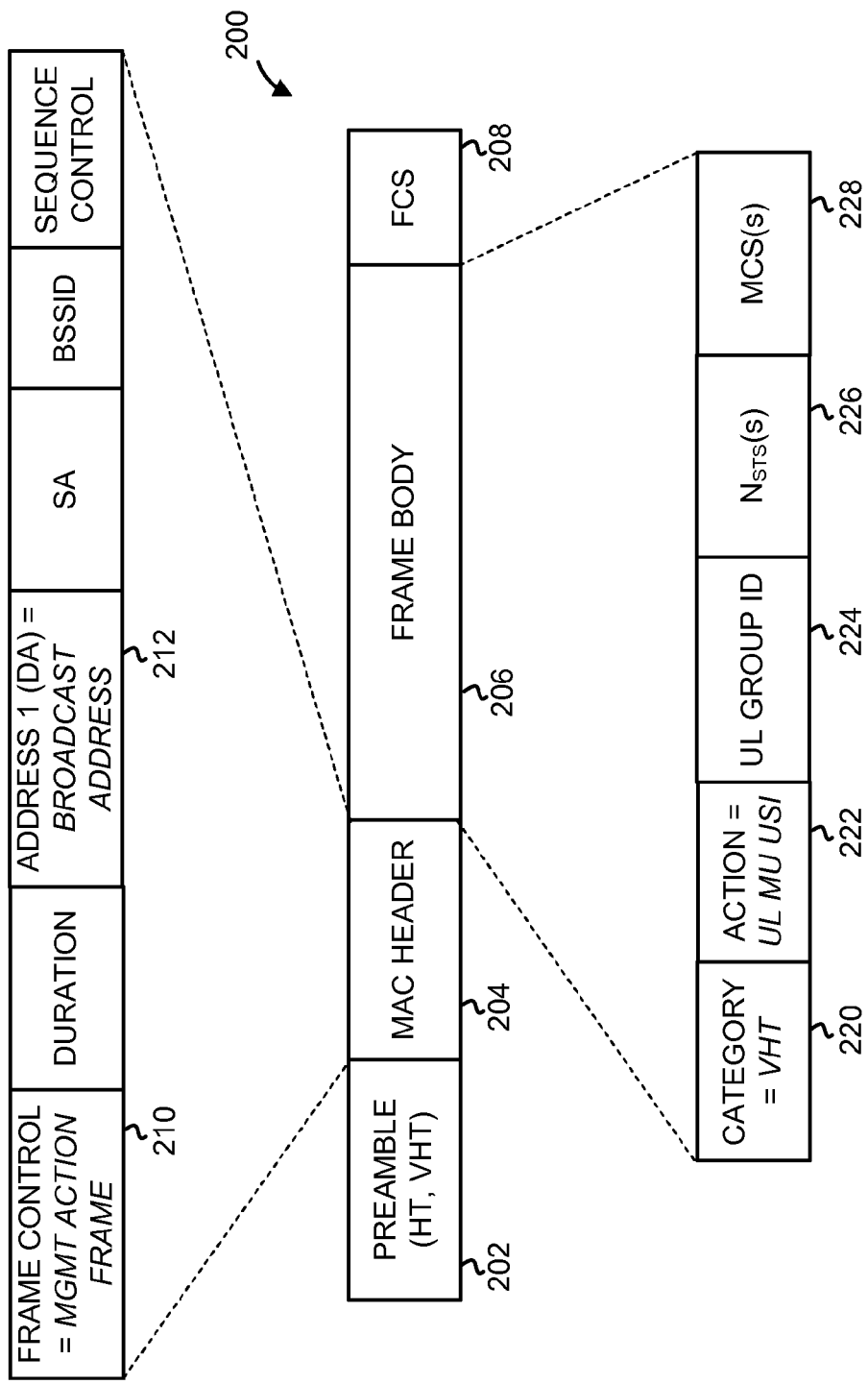
FIG. 4 is a diagram of an example format of a communication frame that an AP transmits to a group of several stations to control simultaneous uplink transmission of data from stations in the group to the AP, in an embodiment.

FIG. 4 is a diagram of an example format of a USI frame 200 that an AP transmits to a group of several stations to control simultaneous uplink transmission of data from stations in the group to the AP. In an embodiment, the USI frame 200 includes a preamble portion 202, a media access control (MAC) portion 204, a frame body 206, and a frame sequence check (FCS) portion 208. The preamble portion 202 in some embodiments includes HT and/or VHT information and, in particular, an indication (i.e., the identifier) of a UL group for which the USI frame 200 is transmitted as well as information indicative of MCS and/or coding settings for stations participating in a UL group, as discussed in more detail with reference to FIG. 5. The MAC header portion 204 includes a frame control field 210 to indicate that the USI frame 200 is a management or action frame and a destination address field 212 set to the broadcast address value, according to an embodiment. In another embodiment, however, the destination address is set to an address of a particular station included in the UL group to which the USI frame 200 is transmitted in a unicast mode. In an embodiment, the MAC header portion 204 also includes other information typically included in a MAC header of a communication frame such as duration, source address, basic service set identifier (BSSID), and sequence control.

The frame body 206 includes a category field 220 to indicate that at least the frame body 206 is being transmitted in the VHT mode, an action field 222 to indicate that the frame 200 is a UL MU USI frame, a UL group identifier 224 to indicate to which UL group the frame 200 pertains, an indication field 226 (for one, some, or all stations in the UL group) of which streams of the wireless communication channel shared by the receiving device and several transmitting devices are assigned to the station, and an indication field 228 of an MCS assigned to one, some, or all stations in the UL group.

For example, referring back to FIG. 1, the AP 12 in an example scenario broadcasts a USI frame (formatted as the frame 200, for example) in which the UL group identifier 224 identifies the group G, and the indication 226 specifies that the first two streams of the four streams available to the AP 12 are assigned to the station 14, and that the other two streams are assigned to the station 16. The AP 12 in this example scenario further identifies the fastest MCS suitable for the group G and specifies the identified MCS to the stations 14 and 16 using the identification field 228.

In an embodiment, the frame body 206 also includes a power level setting for one or several stations in the UL group. However, it is noted that an AP in at least some of the embodiments groups stations so that the stations use nominal transmit power levels in UL MU transmissions to the AP, and power level setting information in the USI frame 200 in these embodiments is not needed.

Figure 5:
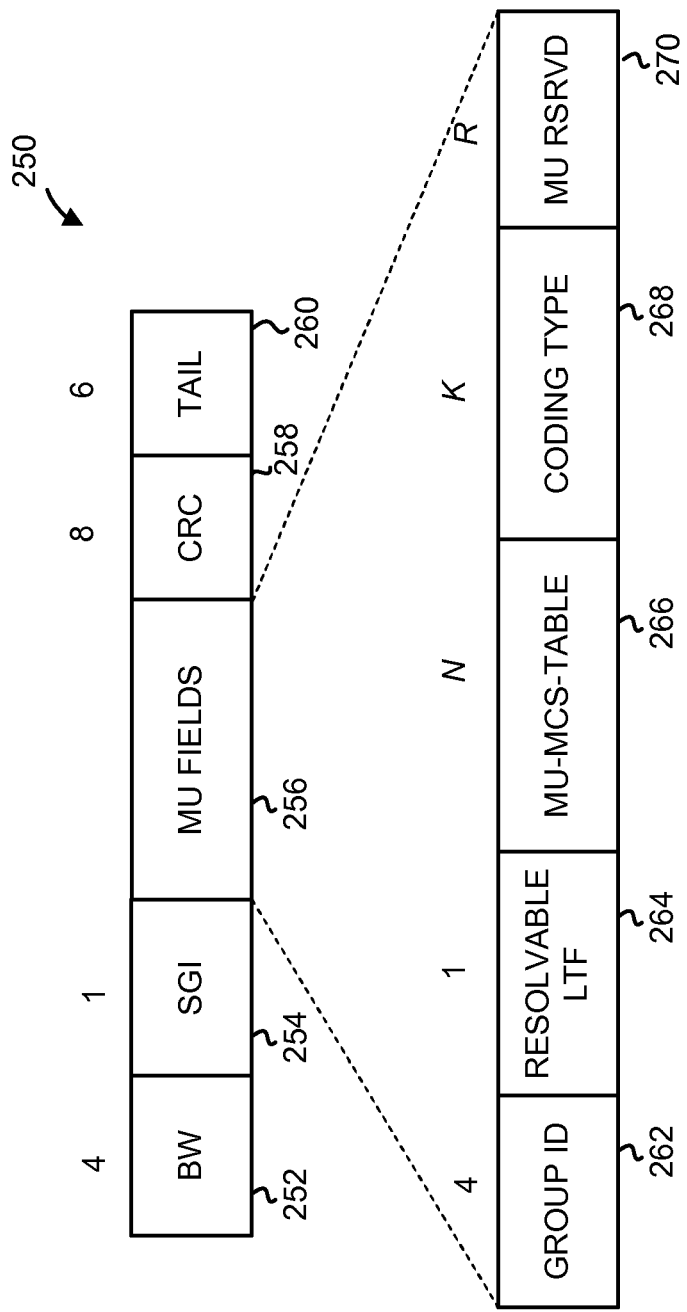
FIG. 5 is a diagram of an example bit allocation for an element used in a physical layer (PHY) preamble of a communication frame used in simultaneous uplink transmission, according to an embodiment.

Next, FIG. 5 is a diagram of an example bit allocation for an element 250 used in a PHY preamble of a communication frame in UL MU transmissions, according to an embodiment. Several fields of the element 250 are identified in FIG. 5, with the number of bits allocated to each field listed above the corresponding field. In one embodiment, the element 250 is included in one of the VHT-SIG fields 58-1, 58-2, or 58-3 (see FIG. 2). A receiving device such as an AP includes the element 250 in the preamble of a USI frame transmitted to several transmitting devices such as stations included in a UL group, and each station includes a copy of the element 250 in PHY preamble of the communication frame which the station transmits to the AP simultaneously with another station in the group.

The element 250 includes a bandwidth subfield 252, a short guard interval (SGI) subfield 254, an MU fields portion 256, a cyclic redundancy check (CRC) subfield 258, and a subfield 260 including tail bits, in an embodiment. As illustrated in FIG. 5, the MU fields portion 256 includes a group identifier subfield 262, a resolvable LTF subfield 264, an MU MCS table subfield 266, a coding type subfield 268, and MU reserved subfield 270 which may be used to implement MU features developed in the future, according to an embodiment. Regarding the MU MCS table subfield 266, in an embodiment, information included in this subfield indicates MCS settings for K devices by indicating the particular combination being used. For example, if the MCS table subfield 266 includes N bits, $2^N$ combinations of MCS settings can be specified. Example techniques for indicating spatial or space-time streams in a communication systems, as well as certain related techniques, are disclosed in a co-pending U.S. patent application Ser. No. 12/910,608, entitled "Number of Stream Indication for WLAN" (hereinafter, "the MP3415 application") and filed on Oct. 22, 2010, the entire disclosure of which is hereby incorporated by reference herein.

Further, in an embodiment, the coding type subfield 268 includes K bits to indicate respective coding type for each of the K devices. In another embodiment, the element 250 also includes a space-time block coding (STBC) subfield to indicate STBC settings.

In some situations, several candidate devices lack sufficient spatial diversity to operate in a UL MU mode as a single UL group. In an embodiment, an appropriate subspace index (SSI) is assigned to a candidate device depending on the current position of the candidate device relative to the AP, for example. In particular, devices located in approximately the same sector relative to the AP are assigned the same SSI, while devices spaced sufficiently apart (from the perspective of the AP) are assigned different SSIs. It is noted that in general, a UL group in which no two stations have the same SSIs is likely to have good spatial diversity. Accordingly, stations having different SSIs can be grouped together for UL MU purposes, provided other requirements are satisfied.

Figure 6:
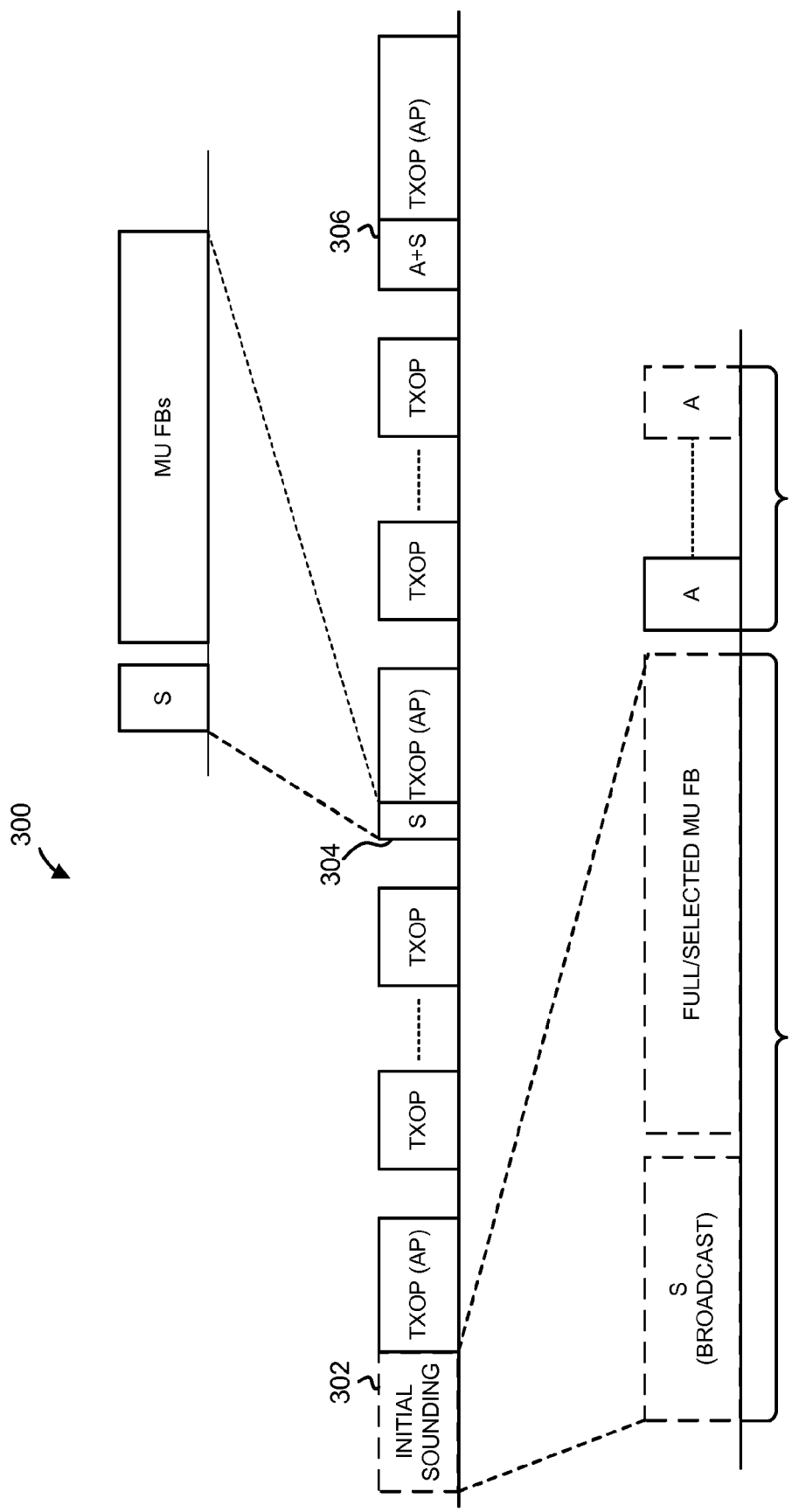
FIG. 6 is a timing diagram that illustrates an example technique for assigning subspace indices (SSIs) to stations that lack sufficient spatial diversity relative to other stations, in an embodiment of the present disclosure.

Referring to FIG. 6, a scenario 300 includes an initial sounding session 302 during which an AP conducts initial sounding to collect information indicative of channel conditions of various stations, in an embodiment. Referring back to FIG. 1, for example, the AP 12 can develop (or receive) an estimate of the condition of the channels 30, 32, and 34, in accordance with the technique of FIG. 6. Depending on the embodiment, the initial sounding is conducted using broadcasting, selective channel sounding, or individual channel sounding, and includes corresponding feedback information. Based on the feedback information corresponding to the initial sounding, the AP assigns SSIs to stations, in an embodiment. In other embodiments, the AP assigns SSIs sequentially or randomly. During a sounding update session 304, the AP sounds channels for one or more MU groups or for one or more SSI combinations, in an embodiment. Further, during an SSI update session 306, the AP reassigns some or all SSIs in response to a change in the conditions of one or more channels between the AP and the stations, in an embodiment. For example, certain SSIs are reassigned to cover a different set of stations.

Figure 7:
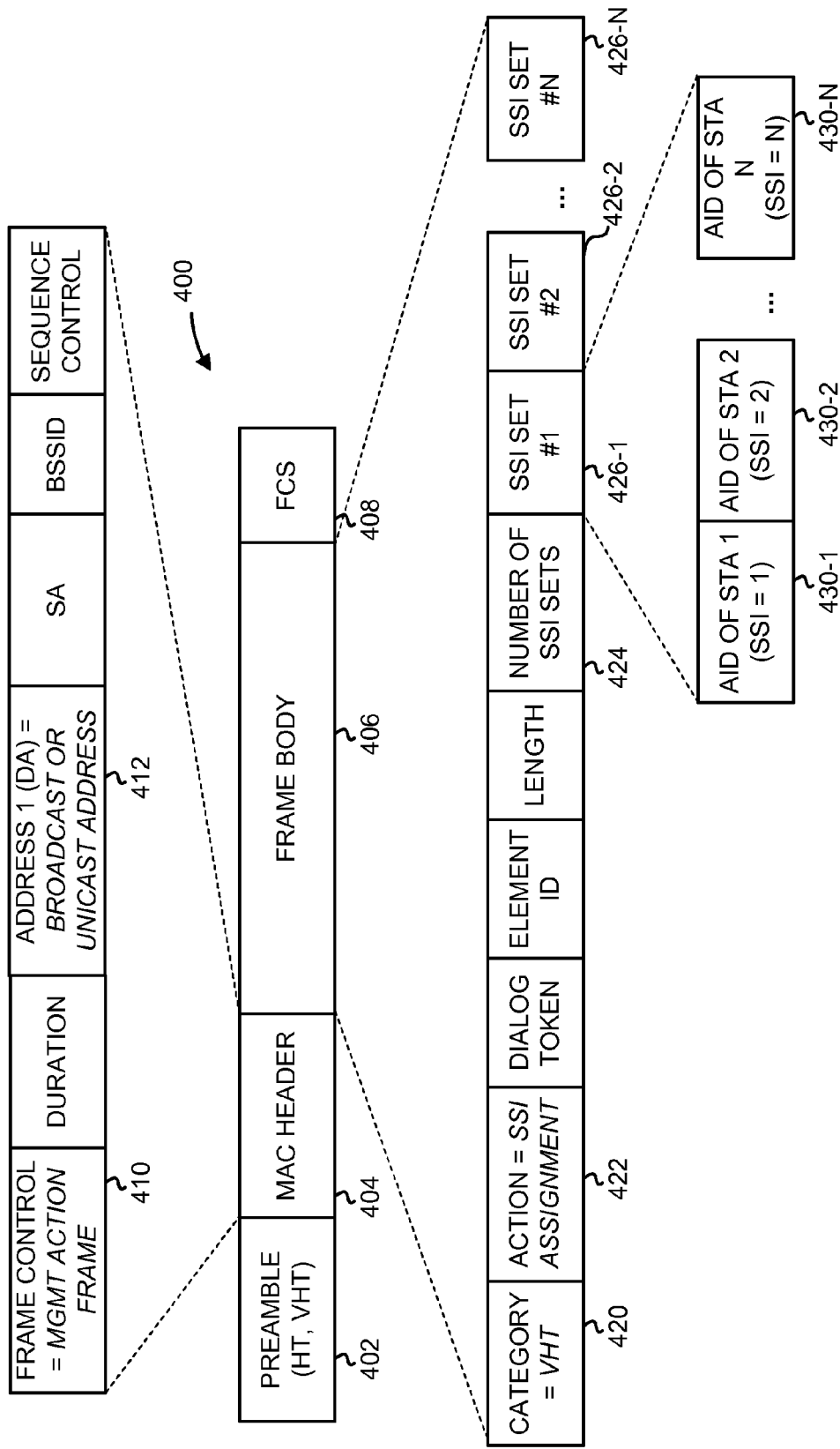
FIG. 7 is a diagram of an example format of a communication frame that an AP transmits to several stations to indicate SSI assignments, in an embodiment of the present disclosure.

FIG. 7 is a diagram of an example format of an SSI assignment frame 400 that an AP transmits to several stations to indicate SSI assignments, in an embodiment. Similar to the frame 200 discussed with reference to FIG. 4, the SSI assignment frame 400 includes a preamble portion 402, a MAC portion 404, a frame body 406, and an FCS portion 408. The preamble portion 402 in some embodiments includes HT and/or VHT information. The MAC header portion 404 includes a frame control field 410 to indicate that the assignment frame 400 is a management or action frame, as well as a destination address field 412 set to the broadcast address value or a unicast address of a particular station, depending on the embodiment.

The frame body 406 includes a category field 420 to indicate that at least the frame body 406 is being transmitted in the VHT mode, an action field 422 to indicate that the frame 400 is an SSI assignment frame, and a number of SSI sets indicator 424 to indicate the number of SSI set descriptors included in the portion of the frame body 406 that follows the number of SSI sets indicator 424. In an embodiment, each SSI set descriptor 426-1, 426-2, . . . 426-N includes a sequence of AIDs or other station identifiers, with the relative position of each AID indicating the SSI assigned to the station. For example, as illustrated in FIG. 7, the field 430-1 is in the first position in the SSI set descriptor 426-1 and specifies a first AID to indicate that the station identified by the first AID is assigned SSI=1, the field 430-2 is in the second position in the SSI set descriptor 426-1 and specifies a second AID to indicate that the station identified by the second AID is assigned SSI=2, etc. It is noted that each SSI set descriptor 426-1, 426-2, . . . 426-N provides a list of stations having relatively good spatial diversity. Accordingly, in an embodiment, an AP uses SSI set information when selecting stations for participation an UL group, so that the selected stations transmit data in a UL MU mode without having to adjust transmit power levels.

Figure 8:
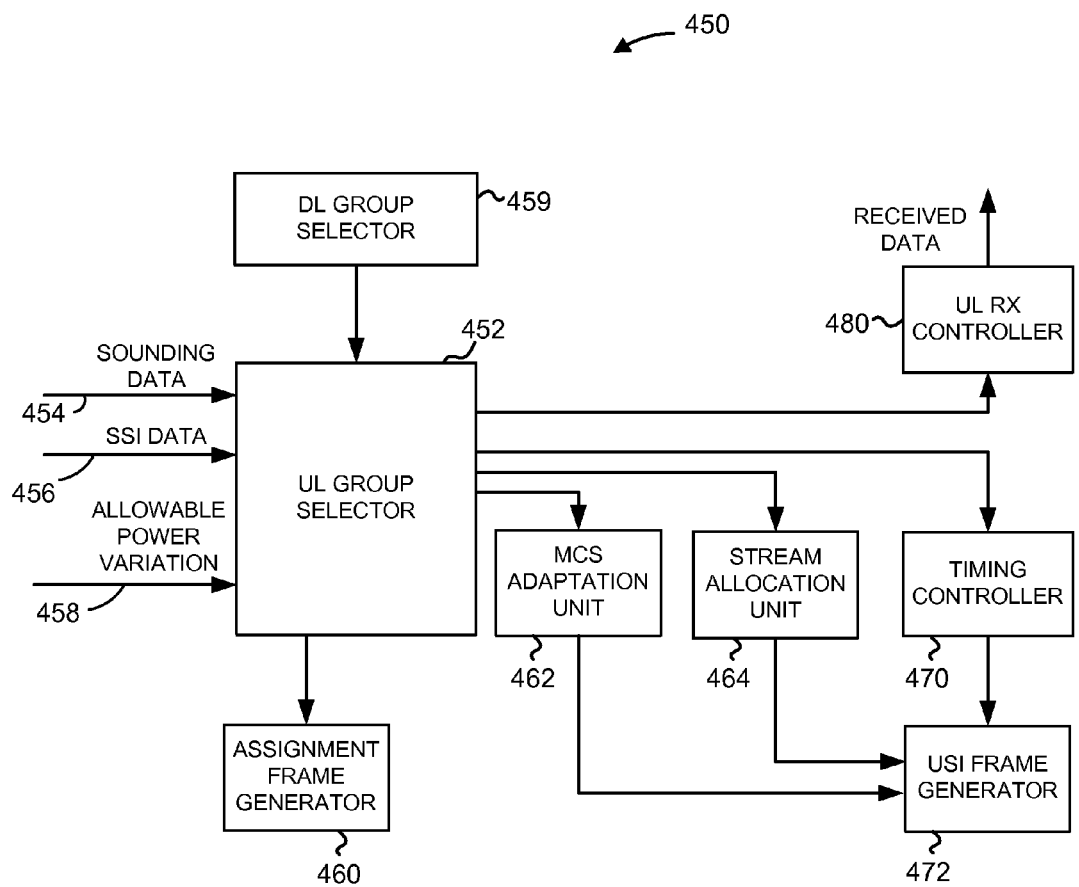
FIG. 8 is a block diagram of an example receiving device that implements a group selection technique, in an embodiment.

Next, FIG. 8 is a block diagram of an example receiving device 450 that implements a UL group selection technique. In an embodiment, the receiving device 450 operates in an AP such as the AP 12, for example (see FIG. 1). In one such embodiment, the UL group controller 20 includes at least some of the components 452, 460, 462, 464, 470, and 472. The receiving device 450 includes a UL group selector 452 that receives one or more of channel sounding data pertaining to several candidate stations via an input 454, SSI data pertaining to some or all of these candidate stations via an input 456, allowable power variation X between stations in a UL group via an input 458, depending on the embodiment. Further, in some embodiments, the UL group also receives additional or alternative information such as the capability of the AP in which the receiving device 450 operates, multipath effect data pertaining to the candidate stations, etc. Still further, a DL group controller 459 provides DL group information to the UL group selector 452, so that a UL group is selected in view of one or more DL groups or is configured to be the same as a certain DL group, in an embodiment.

In view of one or more of these factors, the UL group selector 452 selects two or more stations from among the multiple candidate stations. In an embodiment, the power levels of all signals received from the stations are within the allowable power variation X when the selected stations transmit data without adjusting the corresponding transmit power levels (relative to, for example, the transmit power levels used to channel sounding data which the UL group selector 452 uses to evaluate the candidacy of each station). As discussed above, stations operating in an UL group transmit using the respective nominal power level, according to at least some of the embodiments. It is noted that the data received via one or several of the input 454, 456, and 458 may dynamically change in response to a candidate station moving farther away from the AP or closer to the AP, for example.

In an embodiment, the UL group selector 452 dynamically defines one or more UL groups so that a station is deleted from a certain UL group and moved to a new UL group, for example. In these scenarios, the AP does not need to control the transmit power level of a station by explicitly specifying a power level setting, for example, because the group to which the station is moved is associated with physical parameters (e.g., the power level of a signal received at the AP, the distance from the AP) similar to those of the station. In other words, the AP in these scenarios continues to implicitly control the transmit power level of stations selected for a UL group by efficiently grouping the stations and regrouping the stations, as needed.

In an embodiment, the group selector 452 is communicatively coupled to an assignment frame generator 460 that generates UL group assignment frames discussed above to be transmitted to candidate stations and/or other stations. The group selector 452 in the embodiment of FIG. 8 is also coupled to an MCS adaption unit 462 to select the desired MCS for use by stations that are members of a certain UL group. In a typical scenario, the MCS adaption unit 462 selects the highest rate of modulation that can be supported by stations in the UL group. Depending on the embodiment, all stations in the UL group are assigned the same MCS, or MCS values are individually selected for at least some of the stations in the UL group. However, in some embodiments or scenarios, the receiving device 450 does not include (or does not utilize) the MCS adaption unit 462, and each station in a UL group selects an appropriate MCS and reports the selected MCS to the AP in the PHY preamble or header of an UL MU communication frame (see FIG. 2), for example.

Further, the UL group selector 452 in some embodiments is coupled to a stream allocation unit 464 to determine which of the streams (e.g., spatial streams) of the shared wireless communication channel are allocated to which stations in a UL group. The MCS adaption unit 462 and the stream allocation unit 464 are coupled to an USI frame generator 472 that generates a USI frame formatted similar to the USI frame 200 illustrated in FIG. 4, according to an embodiment. A timing controller 470 coupled to the UL group selector 452 and the USI frame generator 472 controls the timing of transmitting the USI frame and, accordingly, the timing of arrival of UL MU data frames from the stations in the UL group following a known time interval such as a SIFS.

With continued reference to FIG. 8, the receiving device 450 further includes a UL Rx controller 480 to receive and process UL MU data frames transmitted in accordance with the information specified in the USI frame and the UL group assignment frame, in an embodiment.

Figure 9:
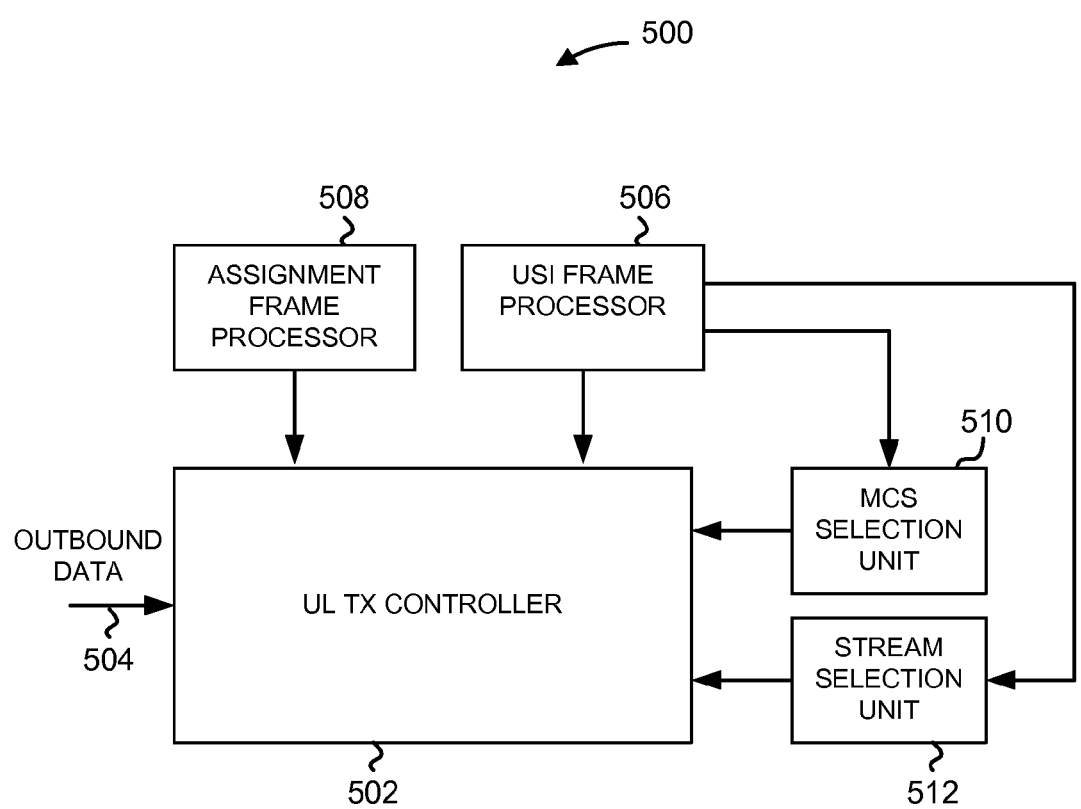
FIG. 9 is a block diagram of an example transmitting device that participates in simultaneous transmission by a group, in an embodiment.

Referring to FIG. 9, an example transmitting device 500 operates in a station assigned to a UL group and supports at least some of the UL group selection techniques of the present disclosure. In an embodiment, the transmitting device 500 includes a UL Tx controller 502 that receives data to be transmitted in UL MU mode via an input 504, a USI frame processor 506 to process USI frames, an assignment frame processor 508 to process UL group assignment frames, an MCS selection unit 510 to select a desired MCS or adopt the MCS assigned by an AP in the USI frame, and a stream selection unit 512 to select streams assigned in the USI frame. In an embodiment, the UL Tx controller 24 of the station 14 is similar to the UL Tx controller 502.

Figure 10:
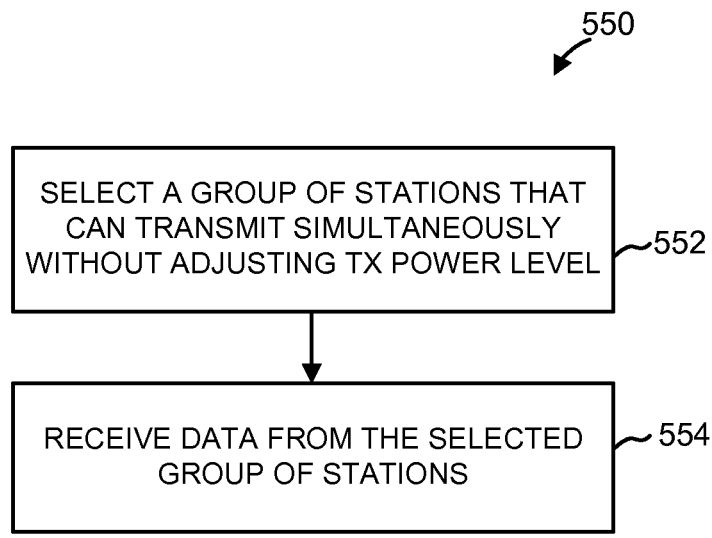
FIG. 10 is a flow diagram of an example method for selecting a group of stations so that simultaneous transmission of data from the group of stations occurs without causing the stations to adjust respective transmit power levels, in an embodiment of the present disclosure.

FIG. 10 is a flow diagram of an example method 550 for selecting a group of stations for operation in a UL MU mode, in an embodiment. The method 552 is implemented in a receiving device such as the receiving device 450, for example. At block 552, two or more stations are selected from multiple candidate stations so that simultaneous transmission of data from the group of stations occurs without causing the stations to adjust respective transmit power levels, in an embodiment. Next, at block 554, UL MU data frames are received in accordance with the UL group selection made at block 552.

Figure 11:
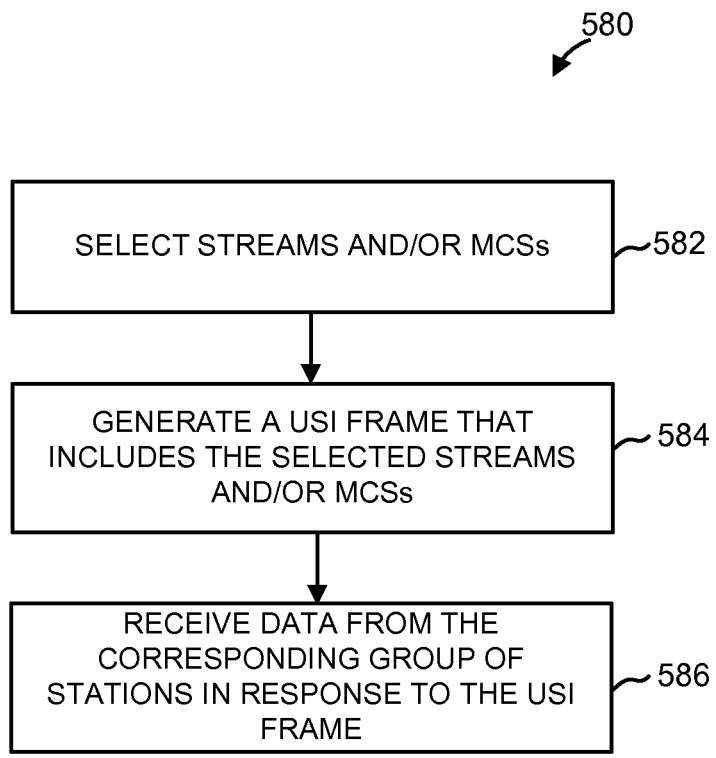
FIG. 11 is a flow diagram of another example method for selecting a group of stations so that simultaneous transmission of data from the group of stations occurs without causing the stations to adjust respective transmit power levels, in an embodiment of the present disclosure.

Referring to FIG. 11, in an embodiment, a method 580 is at least partially implemented in the MCS adaptation unit 462, the stream allocation unit 464, the USI frame generator 472, and the UL Rx controller 480 of the receiving device 450. At block 582, streams and MCS(s) are selected for a certain UL group, according to an embodiment. As indicated above, an MCS is individually assigned to each station in a UL group, or the same MCS is assigned to the entire UL group, depending on the implementation. Next, at block 584, a USI frame is generated with the MCS and/or stream assignment parameters determined at block 582. At block 586, UL MU data frames are received from two or more stations in a UL group via the streams and according to the MCS(s) specified at block 584.

Figure 12:
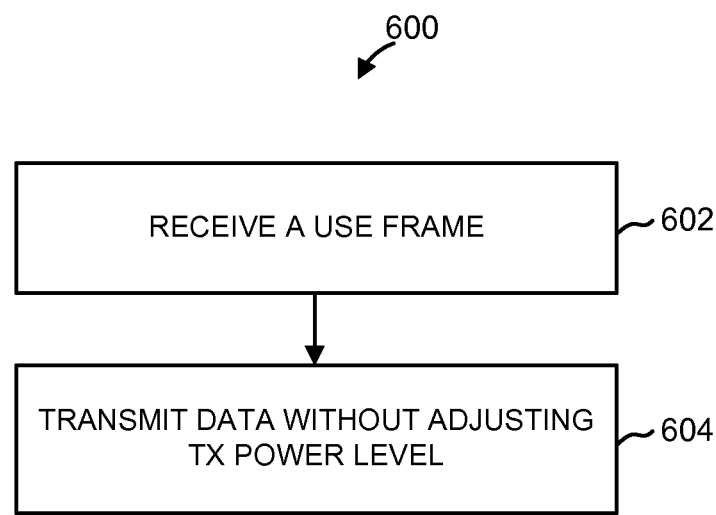
FIG. 12 is a flow diagram of an example method for transmitting uplink data simultaneously with at least one other device in a group, in an embodiment.

FIG. 12 is a flow diagram of an example method 600 for transmitting uplink data simultaneously with at least one other device in a UL group. In an embodiment, the method 600 is implemented in the transmitting device 500. At block 602, a USI frame (formatted as illustrated in FIG. 4, for example) is received. As discussed above, the USI frame controls one or more of the timing of UL MU transmissions, the selection of a UL group that transmits UL MU data in response to the USI frame, the MCS selection, the allocation of streams, etc., depending on the embodiment. At block 604, the device implementing the method 600 transmits MU UL data to a receiving device simultaneously with at least one other device without adjusting the transmit power level, in an embodiment. In at least some of the embodiments, the unadjusted transmit power level is the nominal transmit power level of the device.

Further, in an embodiment, the method 600 also includes receiving a UL group assignment frame (not shown) prior to receiving the USI frame at block 602. In another embodiment, the method 600 includes receiving a DL group assignment frame prior to receiving the USI frame at block 602, and the DL group assignment is used in UL MU transmissions.

In general, the techniques of the present disclosure are applicable to other types of wireless networks such as implemented in a peer-to-peer networks, for example.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions can be stored in any computer readable memory such as on a magnetic disk, an optical disk, or other storage medium, in a RAM or ROM or flash memory, processor, hard disk drive, optical disk drive, tape drive, etc. Likewise, the software or firmware instructions can be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions can be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions can include machine readable instructions that, when executed by the processor, cause the processor to perform various acts.

When implemented in hardware, the hardware can comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

The invention claimed is:

1. A method, comprising:
   selecting, at an access point device, a group of two or more transceivers from a plurality of transceivers for simultaneous transmission of respective data to the access point device, wherein the group of transceivers is selected so that respective power levels of signals received, at the access point device, from any two transceivers in the group of transceivers differ by no more than a predetermined amount;
   generating, at the access point device, a first data unit having a first physical layer (PHY) preamble, wherein the first data unit indicates which of the plurality of transceivers belong to the group of transceivers;
   transmitting the first data unit to each transceiver in the group of transceivers; and
   generating, at the access point device, a second data unit having a second PHY preamble, wherein the second data unit includes information indicative of at least one of (i) an identifier of the group of transceivers, (ii) a time at which the group of transceivers is to transmit the respective data to the access point device, (iii) an assignment of streams to each transceiver in the group of transceivers, and (iv) an MCS to be used by each transceiver in the group of transceivers;
   transmitting the second data unit to each transceiver in the group of transceivers; and
   receiving, at the access point device, the respective data from each transceiver in the group of transceivers simultaneously via a shared wireless communication channel, wherein the respective data is transmitted responsive to the second data unit.

2. The method of claim 1, wherein:
the second data unit indicates the time at which the group of transmitting devices are to simultaneously transmit the respective data to the access point device.

3. The method of claim 2, wherein:
the shared wireless communication channel includes a plurality of streams, and
the second data unit includes an indication of which of the plurality of streams is/are assigned to each transceiver in the group of transceivers.

4. The method of claim 2, wherein the second data unit includes an indication of a modulation and coding scheme (MCS) assigned to each transceiver in the group of transceivers.

5. The method of claim 1, wherein:
the predetermined amount is determined by the access point device.

6. The method of claim 1, wherein simultaneously receiving respective data from each in transceiver the group of transceivers includes using spatial division multiple access (SDMA).

7. The method of claim 1, wherein:
the group of transceivers is an uplink transmission group; and
the uplink transmission group is different from a downlink transmission group,
wherein the downlink transmission group is selected from the plurality of transceivers for simultaneous transmission of respective data from the access point device to each transceiver in the downlink transmission group.

8. The method of claim 1, wherein:
the group is a first group; and
the method further comprising comprises:
removing one transceiver of the first group of transceivers from the first group, and
adding the one transceiver to a second group of two or more transceivers, wherein:
the second group is different from the first group, and
the second group of transceivers is selected so that respective power levels of signals received, at the access point device, from any two transceivers in the second group of transceivers differ by no more than the predetermined amount.

9. The method of claim 8, wherein removing the one transceiver of the first group of transceivers is in response to detecting at least one of: (i) that the one transceiver has moved farther away from the access point device or closer to the access point device; and (ii) a change in an environmental condition that affects communications between the one transceiver and the access point device.

10. The method of claim 1, wherein simultaneously receiving the respective data from each transceiver in the group of transceivers includes receiving a respective communication frame from each transceiver in the group of transceivers, wherein each communication frame includes an indication of an MCS used to transmit the communication frame.

11. The method of claim 1, further comprising:
sounding the shared wireless communication channel for each transceiver in the plurality of transceivers to generate sounding data,
wherein the group of transceivers is selected from the plurality of transceivers using the sounding data.

12. The method of claim 1 wherein
the group of transceivers is selected so that each transceiver in the group of transceivers transmits the respective data to the access point device at a nominal power level of the transceiver simultaneously with every other transceiver in the group, and
the nominal power level of the transceiver is at least one of (i) a factory setting, and (ii) a default value associated with a communication protocol according to which the transceiver and the access point device communicate.

13. An apparatus, comprising:
an access point transceiver configured to
select a group of two or more client transceivers from a plurality of client transceivers so that so that respective power levels of signals received, at the access point transceiver, from any two client transceivers in the selected group of client transceivers differ by no more than a predetermined amount,
generate a first communication frame to be transmitted to each client transceiver in the group of client transceivers, wherein the communication frame includes information indicative of which client transceivers in the plurality of client transceivers belong to the group,
transmit the first communication frame to each client transceiver in the group of client transceivers,
generate a second communication frame to be transmitted to each client transceiver in the group of client transceivers, wherein the second communication frame is to control a time at which each client transceiver in the group of client transceivers transmits the respective data to the access point transceiver,
transmit the second communication frame to each client transceiver in the group of client transceivers, and
process the respective data simultaneously received from each client transceiver in the group of client transceivers via a shared wireless communication channel.

14. The apparatus of claim 13, wherein the access point transceiver is configured to:
generate a first indication of an MCS assigned to each client transceiver in the group of client transceivers,
include the first indication in the second communication frame,
generate a second indication of which of the plurality of streams are assigned to each client transceiver in the group of client transceivers, and
include the second indication in the second communication frame.

15. The apparatus of claim 13, wherein the access point transceiver is configured to:
determine the time at which the group of client transceivers is to simultaneously transmit data to the access point transceiver, and
cause the second communication frame to be transmitted to each client transceiver in the group of client transceiver at a predetermined interval prior to the determined time, wherein the second communication frame is configured to prompt each client transceiver in the group of client transceiver to transmit at the determined time.

16. The apparatus of claim 13, wherein the access point transceiver is configured to select the group of client transceivers using sounding data indicative of a respective communication channel between the access point transceiver and each of the plurality of client transceivers.

17. The apparatus of claim 13, wherein the access point transceiver is configured to:
select the group of client transceivers so that each client transceiver in the group of client transceivers transmits the respective data to the access point transceiver at a nominal power level of the client transceiver simultaneously with every other client transceiver in the group, and the nominal power level of the client transceiver is at least one of (i) a factory setting, and (ii) a default value associated with a communication protocol according to which the client transceiver and the access point transceiver communicate.

18. The apparatus of claim 13, further comprising a plurality of antennas coupled to the access point transceiver.

\* \* \* \* \*